United States Patent [19]

Matsuda et al.

[11] Patent Number: 4,999,135

[45] Date of Patent: Mar. 12, 1991

[54] RUST-PROOF SEALING COMPOSITION

[76] Inventors: Hiroshi Matsuda; Toshiyuki Nitta; Toshiyuki Aoki, all of 2184, Oaza Shimoono, Sowamachi, Sarushima-gun, Ibaraki-ken, Japan

[21] Appl. No.: 339,598

[22] Filed: Apr. 17, 1989

[51] Int. Cl.$^5$ .................. H01B 1/06; C08K 63/00; C08L 63/00

[52] U.S. Cl. .................. 252/511; 252/507; 252/509; 252/506; 523/457; 523/458; 523/427; 523/428

[58] Field of Search .............. 252/506, 507, 509, 511; 523/468, 457–459, 427, 415, 417, 48, 428, 429

[56] References Cited

U.S. PATENT DOCUMENTS

| | | | |
|---|---|---|---|
| 4,353,816 | 10/1982 | Iwasa | 252/511 |
| 4,479,890 | 10/1984 | Prabhu et al. | 252/511 |
| 4,756,848 | 7/1988 | Tieke et al. | 252/511 |
| 4,835,240 | 5/1989 | Togashi et al. | 252/511 |

*Primary Examiner*—Josephine Barr
*Attorney, Agent, or Firm*—Malcolm B. Wittenberg

[57] ABSTRACT

A rust-proof sealing composition contains 30 to 90 parts by weight of an epoxy resin, 8 to 30 parts by weight of a curing agent containing a carboxylic acid derivative selected from the group consisting of aminocarboxylic acid, polycarboxylic acid hydrazide having not less than 8 carbon atoms and mixtures thereof, 1 to 20 parts by weight of an electrically conductive carbon and a balance of a filler such that the total amounts make up 100 parts by weight. The epoxy resin contains 100 to 30 wt. % of a modified epoxy resin selected from the group consisting of a butadiene/acrylonitrile-modified epoxy resin, an urethane-modified epoxy resin and mixtures thereof, and 0 to 70 wt. % of an epoxy other than the modified epoxy resin.

12 Claims, No Drawings

RUST-PROOF SEALING COMPOSITION

BACKGROUND OF THE INVENTION

This invention relates to a rust-proof sealing composition used for example in an assemblying process for vehicle bodies.

As the rust-proof sealer used for hemming portions of, for example, a bonnet, a door or a trunk lid of a vehicle, there is known in the art for example a heat curable one part epoxy adhesive.

This heat curable one part epoxy adhesive has, however, a drawback that, although it has a high adhesion strength after heat curing, it exhibits high distortion after curing, so that its coating position and volume tends to become inadequate, thus leading to distortion and lowering in quality and appearance of a component panel, which requires a corrective operation. Also, in case of using an adhesive exhibiting high curing distortion, cracks may be formed at the boundary portions between the adhesive and the steel plate due to internal stresses so that rusting tends to start at these boundary portions to lower its rust-proof properties.

Moreover, the conventional epoxy type adhesive tends to wash off easily by showering of hot water employed for example during the pre-treatment processes for electrodeposition, so that it may be lowered in viscosity and hence may be unable to perform its proper function.

SUMMARY OF THE INVENTION

It is a principal object of the present invention to provide a rust-proof sealing composition which is superior in rust-proof properties and extremely low in volumetric contraction upon curing, while exhibiting electrically conductive properties.

It is another object of the present invention to provide a rust-proof sealing composition which is superior in durability, viscosity and non-sagging properties and is insoluble in defatting liquids, chemical treatment liquids or in warm water in uncured state and in which changes in profile or scaling-off may be prevented from ocurring.

It is a further object of the present invention to provide a rust-proof sealing composition exhibiting the strength after curing which is comparable to the yield strength of the metal to which the composition is applied.

The above and other objects of the invention will become apparent from the following description.

According to the present invention, there is provided a rust-proof sealing composition comprising 30 to 90 parts by weight of an epoxy resin, 8 to 30 parts by weight of a curing agent containing a carboxylic acid derivative selected from the group consisting of aminocarboxylic acid, polycarboxylic acid hydrazide having not less than 8 carbon atoms, and mixtures thereof, 1 to 20 parts by weight of an electrically conductive carbon, and a balance of a filler such that the total amounts make up 100 parts by weight, said epoxy resin containing 100 to 30 wt. % of a modified epoxy resin selected from the group consisting of a butadiene/acrylonitrile-modified epoxy resin, an urethane-modified epoxy resin and mixtures thereof, and 0 to 70 wt. % of an epoxy other than the modified epoxy resin.

PREFERRED EMBODIMENTS OF THE INVENTION

The rust-proof sealing composition of the present invention is a heat curable composition containing a specific epoxy resin, a specific curing agent, an electrically conductive carbon and a filler at specific relative contents, and is preferably in the form of a one part type paste.

The epoxy resin employed in the present invention is a resin exhibiting durability and resiliency without addition of resilient substances, such as, for example, synthetic rubber, vinyl chloride resin, polyamide resin, butyral resin, formal resin or phenoxy resin. More specifically, the epoxy resin contains butadiene/acrylonitrile-modified epoxy resin, referred to hereinafter as NBR-modified epoxy resin, and/or urethane-modified epoxy resin, as the essential components, and occasionally other epoxy.

The aforementioned NBR-modified epoxy resin has preferably an epoxy equivalent of 120 to 1000 g/eq and most desirably 190 to 400 g/eq, a viscosity of not lower than 50 poises/25° C. and most desirably 90 poises/25° C. to 800 poises/50° C. and a melting point of not higher than 120° C. A commercially available product may be used as the epoxy resin.

The aforementioned urethane-modified epoxy resin has preferably an epoxy equivalent of 120 to 900 g/eq and most desirably 150 to 300 g/eq and a viscosity of 15 to 700 poises/25° C. and most desirably 30 to 150 poises/25° C. A commercially available product may be used as the epoxy resin.

The epoxy other than the aforementioned NBR-modified epoxy resin and the urethane-modified epoxy resin may preferably include bisphenol A type epoxy resin, bisphenol F type epoxy resin, bisphenol AD type epoxy resin, phenol novolak type epoxy resin, such as phenol formaldehyde novolak, brominated epoxy resin, such as tetrabromo bisphenol A type resin, glycidyl ether type epoxy resin, such as aliphatic polyols exemplified by 1,6-hexanediol, glycidyl ester type epoxy resin, such as diglycidyl phthalate, cycloaliphatic epoxy resin, such as dicyclopentadien dioxide or bis(2,3-epoxycyclopentyl)ether, glycidyl amine type epoxy resin, such as tetraglycidyl diamino diphenylmethane, or heterocyclic epoxy resin, such as glycidyl glycidoxyalkylhydantoin, and most preferably include bisphenol A, F or AD type epoxy resin or glycidyl ether type epoxy resin having the epoxy equivalent of 190 to 850 g/eq and a viscosity of 20 poises/25° C. to 500 poises/40° C. A commercially available product may also be employed.

The relative contents of the aforementioned epoxy resin components are 100 to 30 wt. % of the NBR-modified epoxy resin and/or urethane-modified epoxy resin and 0 to 70 wt. % of the other epoxy. If the contents of the NBR-modified epoxy resin and/or urethane-modified epoxy resin are less than 30 wt. %, that is, if the contents of the other epoxy exceed 70 wt. %, the modulus of elasticity on traction of the present composition after curing is increased and its bendability is lowered.

According to the present invention, the contents of the aforementioned epoxy resins in the composition are 30 to 90 parts by weight and preferably 40 to 70 parts by weight to 100 parts by weight of the composition. If the contents of the epoxy resins are less than 30 parts by weight, sufficient adhesion strength of the composition cannot be obtained, while its durability is lowered. On the other hand, if the contents of the epoxy resins exceed 90 parts by weight, the composition may exhibit higher temperature sensitivity and may be deformed or fly off during the pre-treatment processes for electrodeposition.

According to the present invention, the curing agent is a compound which may be reacted on heating with the epoxy groups of the epoxy compounds, is superior in storage stability and able to afford excellent flexibility and durability to the composition after curing. It is a compound containing a carboxylic acid derivative selected from the group consisting of polycarboxylic acid hydrazide having not less than 8 and preferably 8 to 20 carbon atoms and aminocarboxylic acid.

The aforementioned polycarboxylic acid hydrazide having not less than 8 carbon atoms may be represented by the following formula (I):

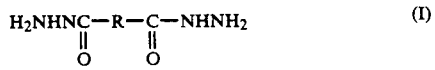

(I)

wherein R stands for a straight-chained or cyclic alkenyl group having not less than 6 carbon atoms and may be enumerated for example by suberic acid dihydrazide, azelaic acid dihydrazide, dodecane dioic acid dihydrazide, eicosane dioic acid dihydrazide or 1,3-bis(hydrazino-carboethyl)-5-isopropylhydantoin. Conventional curing catalysts, such as imidazole or guanidine compounds, or dicyanamide, may be used in combination. If the number of carbon atoms of polycarboxylic acid hydrazide is not more than 7, the curing strain of the rust-proof sealing composition is increased after curing, so that the strength, for example, of the sealing composition tends to be lowered.

The aforementioned aminocarboxylic acid may include for example a compound represented by the following formula (II):

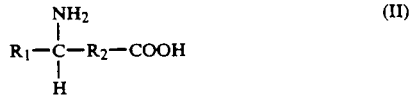

(II)

wherein $R_1$ stands for a hydrogen atom or a straight-chained or branched hydrocarbon residue having 1 to 7 carbon atoms and $R_2$ stands for a divalent straight-chained hydrocarbon residue having not less than 9 carbon atoms. If the number of carbon atoms of $R_1$ is not less than 8, manufacture is rendered difficult. On the other hand, if the number of carbon atoms of $R_2$ is not more than 8, the desired curing effect is not exhibited. Specific examples of the aforementioned aminocarboxylic acid may include 11-aminoundecanoic acid, 12-aminododecanoic acid, 13-aminotridecanoic acid, 15-aminopentadecanoic acid, 17-aminoheptadecanoic acid and 12-aminostearic acid.

According to the present invention, the relative contents of the aforementioned curing agent in the composition are 8 to 30 parts by weight and preferably 10 to 20 parts by weight to 100 parts by weight of the composition. If the contents of the curing agent are less than 8 parts by weight, curing is less liable to occur. On the other hand, if the contents exceed 30 parts by weight, the modulus of elasticity on traction of the cured product exceeds 15.0 kg/mm$^2$ so that excellent flexibility cannot be maintained.

According to the present invention, the electrically conductive carbons may be those carbons affording electrical conductivity to the rust-proof sealing composition without affecting its viscosity, fluidity or curing properties. For example, carbon blacks selected from by-product carbons such as those manufactured and sold under the trade name of "KETJENBLACK" from Nippon E.C. Co., Ltd., acetylene black, and mixtures thereof, may be employed.

According to the present invention, the relative contents in the composition of the electrically conductive carbons are 1 to 20 parts by weight and preferably 2 to 10 parts by weight to 100 parts by weight of the composition. If the contents of the electrically conductive carbons are less than 1 part by weight, the electrical conductivity of the composition cannot be obtained, while the electrodeposition cannot be performed for curing. On the other hand, if the contents exceed 20 parts by weight, the composition cannot be employed because the electrically conductive carbons absorb more oil and the viscosity of the composition is increased.

Although there is no limitation to the filler employed in accordance with the present invention, it is preferably selected from the group consisting of inorganic fillers such as, for example, talc, magnesium carbonate, silicon oxide, titanium oxide or chalk, and resin powders. As a viscosity conditioner for the composition, non-reactive diluents such as soya bean oil, castor oil, or straight-chained glycol or mono-, di- or trifunctional reactive epoxy resin diluents, may be employed.

According to the present invention, the relative contents of the filler to the composition are such that the total contents make up 100 parts by weight. That is, the filler can be contained in the composition so that the total amounts of the epoxy resin, curing agent, electrically conductive carbon and filler make up 100 parts by weight.

In preparing the rust-proof sealing composition of the present invention, the epoxy resin, curing agent, electrically conductive carbon and filler are charged into a mixer, such as kneader mixer or planetary mixer, and mixed together homogeneously. At this time, mixing is preferably performed while the mass is cooled by cooling water to prevent heat evolution. Also, defoaming is preferably performed under reduced pressure to remove air bubbles.

For curing the rust-proof sealing composition of the present invention, the composition is deposited onto a hemming portion of a door or a hood of a vehicle, such as automotive vehicle, by a constant volume discharge gun or a flow gun, using a pressure delivery pump, and subjected to electrodeposition and baking finish in a known manner for curing, preferably at a temperature of 150° to 200° C. and for a time interval of 20 to 60 minutes.

The rust-proof sealing composition of the present invention preferably has a modulus of elasticity on traction of 0.01 to 15.00 kg/mm$^2$ after curing and a tensile shear strength or adhesion strength about equal to the yield stress of a metal on which the sealing composition is applied.

The rust-proof sealing composition of the present invention exhibits superior durability, viscosity and non-sagging properties in the uncured state, so that it can be handled easily and can be used advantageously as the rust-proof sealer for hemming portions of vehicles or for other industrial applications.

Also the rust-proof sealing composition of the present invention is excellent in rust-proof properties, undergoes only small volumetric contraction on curing and exhibits a strength of cured adhesive comparable to the yield stress of the metal material on which the composition is applied, so that its durability may be maintained for an extended period of time.

EXAMPLES OF THE INVENTION

The present invention will be explained hereinbelow in more detail with reference to the Examples and Comparative Examples. It should be noted, however, that these Examples are given for illustration only and are not intended for limiting the present invention.

EXAMPLE 1

80 parts by weight of an NBR-modified epoxy resin having an epoxy equivalent of 300 and a viscosity of 350 poises/25° C., manufactured by A. C. R. Company Limited under the trade name of "R1309" and 20 parts by weight of a bisphenol A type epoxy resin having an epoxy equivalent of 180 to 200 and a viscosity of 120 to 150 poises/25° C., manufactured by YUKA SHELL EPOXY Company Limited under the trade name of "EPICOAT TM 828", as epoxy resins, 25 parts by weight of aminocarboxylic acid manufactured by ACI Japan Ltd. under the trade name of "K37F", as a curing agent, 8 parts by weight of "BLACK PEARL 2000" manufactured by Cabot Corporation, as an electrically conductive carbon and 15 parts by weight of a reactive diluent consisting essentially of 1,6-hexanediol diglycidyl ether, manufactured by ASAHI DENKA KOGYO K. K. under the trade name of "ED 503", and 50 parts by weight of calcium carbonate type product manufactured by SHIRAISHI CALCIUM KAISHA Ltd. under the trade name of "WHITON SB", as fillers, were charged into a kneader mixer and mixed under agitation for 60 minutes to produce a rust-proof sealing composition, and the following tests were conducted on the produced composition. The test results and the relative contents of the components are shown in Table 1.

Test on Viscosity

An apparent viscosity was measured at a shearing speed of 15 sec$^{-1}$, using a pressure viscometer manufactured by RIGOSHA & Co., Ltd. under the trade name of "APPARENT VISCOMETER OF LUBRICATING GREASE".

Tests on Tensile Shear Strength

A cold rolled steel plate measuring 100×25×0.8 mm, coated with a rust-proof oil to a thickness of not more than 10 microns was coated with the composition produced as above, and the tensile shear strength of the resulting test pieces was measured, using a measuring device manufactured under the trade name of "TENSILON VCT2.5T" by ORIENTEC CORPORATION under the conditions of overlap of 12.5 mm, curing at 170° C. for 30 minutes and a traction speed of 50 mm/minute.

Tests on T-letter Peelinq Strength

A cold rolled steel plate measuring 200×25×0.8 mm, coated with a rust-proof oil to a thickness of not more than 10 microns, was coated with the composition produced as above, and the T-letter peeling strength of the resulting test piece was measured using a measuring device manufactured under the trade name of "TENSILON VCT 100" by ORIENTEC CORPORATION under the conditions of curing at 170° C. for 30 minutes and a traction speed of 200 mm/minute.

Tests on Curing Strain

Each test piece of an A-1050P material prescribed under JIS-H-4000-1970, measuring 25×200×0.5 mm, was coated with the composition produced as described above to a thickness of 1 mm. Each test piece was secured at its one side and cured at 170° C. for 30 minutes. The amount of the strain in mm of each test piece was measured.

Bending Test

Each test piece measuring 25×200×0.8 mm and coated with the composition produced as described above to a thickness of 1 mm was cured at 170° C. for 30 minutes and folded gradually with a mandrel 10 mm in diameter. Each test piece that could be folded to 180° was marked ○ while each test piece in which cracks were formed was marked X.

Test on Modulus of Elasticity on Traction

Test pieces 0.5 mm thick punched to a dumbbell type II (distance between bench marks, 2 cm; width; 1 cm) were coated with the composition produced as described above and cured at 170° C. for 30 minutes. Each test piece was then tracted at a crosshead speed of 10 mm/min. to measure its modulus of elasticity.

Salt Spray Test (Test on Rust-Proofness)

An oil-surfaced steel plate measuring 70×150×0.8 mm and coated with the composition produced as described above was coated centrally with a bead 5 mm in width and 100 mm in length and subjected to surface treatment and electrodeposition. The resulting test piece was charged into a salt spray tester and sprayed with 5 wt. % of salt water and the rusting state was observed after lapse of 1,000 hours.

EXAMPLES 2 to 4

Rust-proof sealing compositions were prepared in the same way as in Example 1, except changing the components and amounts shown in Table 1, and the same tests were conducted as in Example 1. The results are also shown in Table 1.

COMPARATIVE EXAMPLE 1

A rust-proof sealing composition was prepared in the same way as in Example 1, except using 20 parts by weight of a curing agent consisting essentially of adipic acid and manufactured by AJINOMOTO Co., Inc. under the trade name of "ADH", and the same tests were conducted as in Example 1. The results are also shown in Table 1.

COMPARATIVE EXAMPLE 2

A rust-proof sealing composition was prepared in the same way as in Example 1, except using a mixture of 20 parts by weight of "EPICOAT #828" (YUKA SHELL EPOXY Co., Ltd.), a bisphenol A type epoxy resin having an epoxy equivalent of 180 to 200 and a viscosity of 120 to 150 poises/25° C. and "EPU 73" (manufactured by ASAHI DENKA KOGYO K.K.), a urethane-modified epoxy resin having an epoxy equivalent of 220 to 250 and a viscosity of 250 to 260 poises/25° C., as epoxy resins, and the same tests were conducted as in Example 1. The results are also shown in Table 1.

COMPARATIVE EXAMPLES 3 AND 4

Rust-proof compositions were prepared in the same way as in Example 1 except using dicyandiamide and imidazole manufactured by SHIKOKU FINE CHEMICALS CORPORATION under the trade name of "2PHZ" as the curing agents and the components shown in Table 1, and the same tests were conducted as in Example 1. The results are shown in Table 1.

COMPARATIVE EXAMPLE 5

A rust-proof composition was prepared in the same way as in Example 1, except using 80 parts by weight of "EPICOAT #828" used in Example 1, 20 parts by weight of "EPU 73" employed in Comparative Example 2 and 30 parts by weight of "K37F" as the curing agent, and the same tests were conducted as in Example 1. The results are also shown in Table 1.

from the group consisting of a butadiene/acrylonitrile-modified epoxy resin, an urethane-modified epoxy resin and mixtures thereof, and 0 to 70 wt. % of an epoxy other than said modified epoxy resin selected from the group consisting of bisphenol A type epoxy resin, bisphenol F type epoxy resin, bisphenol AD type epoxy resin, phenol novolak type epoxy resin, brominated epoxy resin, glycidyl ether type epoxy resin, glycidyl ester type epoxy resin, cycloaliphatic epoxy resin, glycidyl amine type epoxy resin, heterocyclic epoxy resin and mixtures thereof.

2. The composition according to claim 1 wherein said butadiene/acrylonitrile-modified epoxy resin has an epoxy equivalent of 120 to 1000 g/eq and a viscosity of not less than 50 poises/25° C.

3. The composition according to claim 1 wherein said urethane-modified epoxy resin has an epoxy equivalent of 120 to 900 g/eq and a viscosity of 15 to 700 poises/25° C.

4. The composition according to claim 1 wherein the

TABLE 1

|  | Examples | | | | Comparative Examples | | | | |
|---|---|---|---|---|---|---|---|---|---|
|  | 1 | 2 | 3 | 4 | 1 | 2 | 3 | 4 | 5 |
| Bisphenol A Type Epoxy Resin (1) | 20 | 50 | 20 | 20 | 20 | 20 | 20 | 20 | 80 |
| NBR-Modified Epoxy Resin (2) | 80 | 50 |  | 80 | 80 |  | 80 |  |  |
| Urethane-Modified Epoxy Resin (3) |  |  | 80 |  |  | 80 |  | 80 | 20 |
| Reactive Diluent (4) | 15 | 15 | 15 | 15 | 15 | 15 | 15 | 15 | 15 |
| Curing Agent A (5) | 25 | 25 | 25 |  |  |  |  |  | 30 |
| Curing Agent B (6) |  |  |  | 25 |  |  |  |  |  |
| Curing Agent C (7) |  |  |  |  | 20 | 20 |  |  |  |
| Dicyandiamide |  |  |  |  |  |  | 8 | 8 |  |
| Imidazole (8) |  |  |  |  |  |  | 2 | 2 |  |
| Electrically Conductive Carbon (9) | 8 | 8 | 8 | 8 | 8 | 8 | 8 | 8 | 8 |
| Calcium Carbonate (10) | 50 | 50 | 50 | 50 | 50 | 50 | 50 | 50 | 50 |
| Viscosity (SOD) PS/25° C. | 3500 | 2000 | 3200 | 3200 | 3200 | 3000 | 2300 | 2100 | 1200 |
| Tensile Shear Strength Kg/cm$^2$ | 130 | 150 | 140 | 170 | 210 | 215 | 240 | 245 | 190 |
| T-letter Peeling Strength Kg/25 mm | 18.5 | 15.0 | 20.3 | 27.2 | 5.0 | 5.2 | 24.0 | 23.0 | 2.5 |
| Curing Strain mm | 0.5 | 0.8 | 0.2 | 0.5 | 17.0 | 14.8 | 48.0 | 45.3 | 1.5 |
| Bending Properties | O | O | O | O | X | X | X | X | X |
| Modulus of Elasticity on Traction Kg/mm$^2$ | 1.2 | 2.4 | 1.0 | 10.2 | 21.3 | 20.7 | 27.2 | 24.3 | 14.3 |
| Test on Rust-Proofness | Non | Non | Non | Non | Rust Occurred | Rust Occurred | Rust Occurred | Rust Occurred | Rust Occurred |

Each component is based on parts by weight
(1) Trade Name; EPICOAT #828 (YUKA SHELL EPOXY CO., LTD.)
(2)   "   ; R1309 (A.C.R. COMPANY LIMITED)
(3)   "   ; EPU73 (ASAHI DENKA KOGYO K.K.)
(4)   "   ; ED506 (   "   )
(5)   "   ; K37F (ACI Japan Ltd.)
(6)   "   ; LDH (AJINOMOTO CO., INC.)
(7)   "   ; ADH (   "   )
(8)   "   ; ZPHZ (SHIKOKU FINE CHEMICALS CORPORATION)
(9)   "   ; BLACK PEARL 2000 (Cabot Corporation)
(10)  "   ; WHITON SB (SHIRAISHI CALCIUM KAISHA Ltd.)

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A rust-proof sealing composition comprising 30 to 90 parts by weight of an epoxy resin; 8 to 30 parts by weight of a curing agent containing a carboxylic acid derivative selected from the group consisting of aminocarboxylic acid, polycarboxylic acid hydrazide having not less than 8 carbon atoms and mixtures thereof; 1 to 20 parts by weight of an electrically conductive carbon; and a balance of a filler such that the total amounts make up 100 parts by weight, said epoxy resin containing 100 to 30 wt. % of a modified epoxy resin selected epoxy other than said modified epoxy resin is selected from the group consisting of bisphenol A type epoxy resin, bisphenol F type epoxy resin, bisphenol AD type epoxy resin, glycidyl ether type epoxy resin and mixtures thereof, each having the epoxy equivalent of 190 to 850 g/eq and a viscosity of 20 poises/25° C. to 500 poises/40° C.

5. The composition according to claim 1 wherein said polycarboxylic acid hydrazide having not less than 8 carbon atoms is represented by the following formula (I):

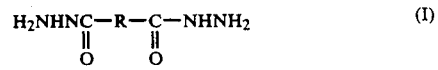

wherein R stands for a straight-chained or cyclic alkenyl group having not less than 6 carbon atoms.

6. The composition according to claim 1 wherein said polycarboxylic acid hydrazide is selected from the group consisting of suberic acid dihydrazide, azelaic acid dihydrazide, dodecane dioic acid dihydrazide, eicosane dioic acid dihydrazide, 1,3-bis(hydrazinocarboethyl)-5-isopropylhydantoin, and mixtures thereof.

7. The composition according to claim 1 wherein said aminocarboxylic acid is represented by the following formula (II):

wherein $R_1$ stands for a hydrogen atom or a straight-chained or branched hydrocarbon residue having 1 to 7 carbon atoms and $R_2$ stands for a divalent straight-chained hydrocarbon residue having not less than 9 carbon atoms.

8. The composition according to claim 1 wherein said aminocarboxylic acid is selected from the group consisting of 11-aminoundecanoic acid, 12-aminododecanoic acid, 13-aminotridecanoic acid, 15-aminopentadecanoic acid, 17-aminoheptadecanoic acid, 12-aminostearic acid and mixtures thereof.

9. The composition according to claim 1 wherein said electrically conductive carbon is acetylene black.

10. The composition according to claim 1 wherein said filler is selected from the group consisting of calcium carbonate, talc, magnesium carbonate, silicon oxide, titanium oxide, chalk and mixtures thereof.

11. The composition according to claim 1 wherein said composition has a modulus of elasticity on traction after curing of 0.01 to 15.00 kg/mm$^2$.

12. The composition according to claim 1 wherein the composition has a tensile shear strength after curing equivalent to the yield stress of a material to which the composition is applied.

* * * * *